United States Patent
Thornton

(10) Patent No.: US 11,206,918 B2
(45) Date of Patent: Dec. 28, 2021

(54) INTERDENTAL BRUSH WITH NYLON YARN STRANDS

(71) Applicant: Parallel Capture Holdings Inc., Wilton, CT (US)

(72) Inventor: Brett W. Thornton, Wilton, CT (US)

(73) Assignee: Parallel Capture Holdings Inc., Wilton, CT (US)

(*) Notice: Subject to any disclaimer, the term of this patent is extended or adjusted under 35 U.S.C. 154(b) by 0 days.

(21) Appl. No.: 16/364,175

(22) Filed: Mar. 25, 2019

(65) Prior Publication Data

US 2019/0290412 A1 Sep. 26, 2019

Related U.S. Application Data

(60) Provisional application No. 62/647,770, filed on Mar. 25, 2018.

(51) Int. Cl.
| | |
|---|---|
| *A46D 1/00* | (2006.01) |
| *A46B 5/02* | (2006.01) |
| *A61C 15/02* | (2006.01) |
| *A46B 3/18* | (2006.01) |

(52) U.S. Cl.
CPC ............... *A46D 1/006* (2013.01); *A46B 3/18* (2013.01); *A46B 5/02* (2013.01); *A46B 5/021* (2013.01); *A46D 1/0207* (2013.01); *A61C 15/02* (2013.01); *A46B 2200/108* (2013.01)

(58) Field of Classification Search
CPC .. A46B 3/18; A46B 5/02; A46B 5/021; A46B 9/04; A46B 2200/108; A61C 15/00; A61C 15/02; A46D 1/006; A46D 1/02; A46D 1/0207

USPC ......... 15/206, 207.2; 132/321, 329; D4/104, D4/107, 112, 131, 138; D28/65

See application file for complete search history.

(56) References Cited

U.S. PATENT DOCUMENTS

| | | | | |
|---|---|---|---|---|
| 3,582,140 | A | * | 6/1971 | Kaufman ................ A46B 3/18 300/21 |
| D337,201 | S | * | 7/1993 | Haddad .......................... D4/107 |
| 6,141,819 | A | * | 11/2000 | Driesen ................... A46D 1/00 15/167.1 |
| 8,356,380 | B2 | | 1/2013 | Breitschmid |
| 9,084,654 | B2 | | 7/2015 | Lee et al. |
| 9,265,333 | B2 | | 2/2016 | Huang |

(Continued)

FOREIGN PATENT DOCUMENTS

| | | |
|---|---|---|
| CA | 2657906 A1 | 9/2009 |
| EP | 0800781 A3 | 2/1999 |

(Continued)

OTHER PUBLICATIONS

Derwent No. 2017-079951 corresponding to KR 2017000245U, published Jan. 18, 2017. (Year: 2017).*

(Continued)

*Primary Examiner* — Mark Spisich

(74) *Attorney, Agent, or Firm* — Michael Downs; Downs IP Law LLC

(57) ABSTRACT

Some embodiments of the present invention provide a novel, twisted-in-wire type interproximal brush equipped with yarn strands. According to some embodiments, the yarn strands may be formed of nylon filament having compression memory characteristics.

20 Claims, 4 Drawing Sheets

(56) References Cited

U.S. PATENT DOCUMENTS

| | | |
|---|---|---|
| 2009/0230756 A1* | 9/2009 | Crossman ............... A46B 9/02 300/21 |
| 2011/0041271 A1 | 2/2011 | Huang |
| 2012/0060308 A1 | 3/2012 | Zahoransky et al. |
| 2015/0000699 A1 | 1/2015 | Kelsey |
| 2015/0257861 A1 | 9/2015 | Dishon |
| 2015/0335141 A1 | 11/2015 | Schär et al. |
| 2017/0105821 A1 | 4/2017 | Kato et al. |
| 2017/0172289 A1 | 6/2017 | Habibi-Naini et al. |
| 2017/0319309 A1 | 11/2017 | Gengyo et al. |
| 2018/0235358 A1 | 8/2018 | Rees |
| 2018/0279755 A1 | 10/2018 | Zhang et al. |

FOREIGN PATENT DOCUMENTS

| | | | |
|---|---|---|---|
| EP | 928577 | * | 7/1999 |
| EP | 2882313 B1 | | 11/2016 |
| JP | 2-295511 | * | 12/1990 |
| JP | 2005-130963 | * | 5/2005 |
| KR | 20110121259 | * | 11/2011 |
| WO | 1992020255 A1 | | 11/1992 |

OTHER PUBLICATIONS

Machine translation of KR 10-2011-0121259, Nov. 2011. (Year: 2011).*

* cited by examiner

US 11,206,918 B2

INTERDENTAL BRUSH WITH NYLON YARN STRANDS

The present application claims the benefit of priority of U.S. Provisional Patent Application No. 62/647,770 filed Mar. 25, 2018, entitled "Interdental Brush with Nylon Yarn Strands."

FIELD OF THE INVENTION

The present invention relates generally to products for cleaning narrow interproximal spaces. The present invention relates in some embodiments to preventive dental products to aid in the cleaning and care of inflamed and infected gums, dental bridges and implants, enlarged gum pockets, due to gum disease, which create large spaces between teeth, and general and preventive, daily oral care.

BACKGROUND

Preventive dental products, with regular use, can serve to prevent development of problems with the teeth and gums. The effectiveness of preventive dental care products is increasingly important with an aging population and a massive population segment called the "baby-boomer" generation moving into the prime demographic segment for preventive dental products. A prior art device that is a twisted-in-wire brush with nylon monofilament bristles is known for use in interdental cleaning and preventive dental care. However, the nylon monofilament bristles of the prior art device have several disadvantages recognized by the inventor. The prior art bristles "lie down" when inserted into an interproximal space (such as an interdental space), offering negligible cleaning "resistance." Also, the nylon monofilament bristles offer limited or no ability to absorb liquid materials (other than that of what would be retained through the natural surface tension of said liquids if they are applied to a hard plastic or metallic surface). Despite these limitations, there are no alternatives to the nylon monofilament bristles of the twisted-in-wire brushes of the prior art.

BRIEF DESCRIPTION OF THE DRAWINGS

An understanding of embodiments described in this disclosure and many of the related advantages may be readily obtained by reference to the following detailed description when considered with the accompanying drawings, of which.

DESCRIPTION

Figure 1:
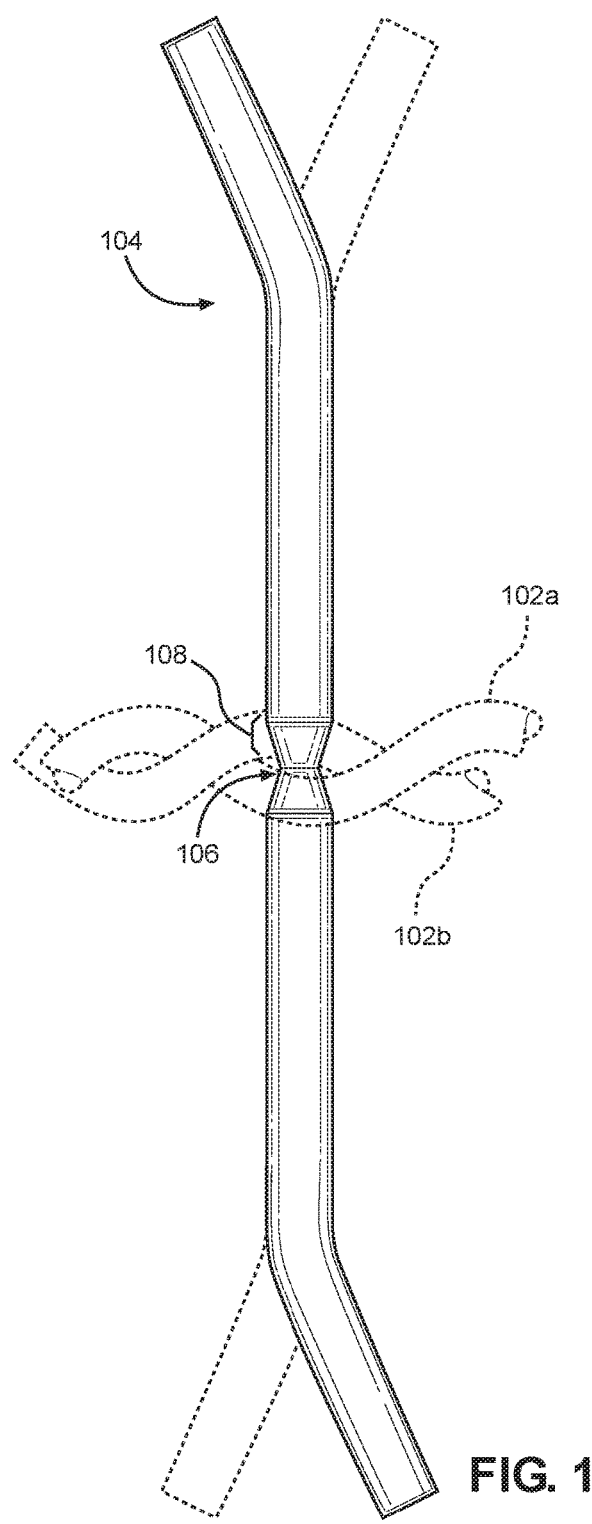
FIG. 1 is a diagram of an interdental brush comprising a nylon yard strand according to an embodiment of the present invention.

Some embodiments of the present disclosure relate to a novel, twisted-in-wire type interproximal brush equipped with yarn strands. According to some embodiments, the yarn strands may be formed of nylon filament that, unlike the prior art monofilament bristles, may have compression memory characteristics. For example, the twisted-in-wire type brush may comprise a plurality of crinkled nylon filament yarn strands (e.g., clamped in twisted wire).

According to some embodiments, in addition to compression memory characteristics, the nylon filament yarn strands "tuft up" in the brush and offer gentle resistance, instead of merely bending or lying flat (like monofilament bristles do) when inserted into an interproximal space.

According to some embodiments of the present invention, the nylon filament yarn strands have advantageous hydrophilic characteristics. A substrate of nylon yarn is easily wetted by all manner of liquids. This means that the user is able to not only utilize the superior cleaning aspects of the nylon yarn brush strands, but, especially in the aggregate, the yarn strands are able to deliver meaningful amounts of liquid. Drugs, hydrogen peroxide, chlorhexidine and the like, can be applied to the yarn strands of the brush and directly targeted to the area of the dentition where these types of materials will be of optimal benefit.

In one or more embodiments of the present invention, the brush is made in the twisted-in-wire brush construction fashion. In one example manufacturing process, between 6 and 20, reel-fed, continuous elements of crinkled, nylon yarn are fed between a pre-cut, u-shaped section of wire that is around two inches in length. These yarn elements preferably are fed in an orientation that is perpendicular to the wire, or, across the wire rather than parallel to it. In one example, the yarn is fed between the closed end only, leaving about % of an inch of wire on the open end that will serve as the brush "handle". The open end, comprised of two wire ends, preferably will be of twisted wire only. The continuous yarn elements are then cut into strands of approximately one inch in length. The closed end of the wire section is held in a rotating, vise-like apparatus and the opposite, open end of the wire section, like legs on a horseshoe, is held in a similar vise-like apparatus. The two vises are rotated in opposite directions until the wire twists together and clamps the yarn in place, firmly between the wires, by utilizing friction. The excess yarn strand material is then trimmed by rapidly spinning the brush along a razor-sharp surface to create either a cylindrical or conical, "Christmas tree" finished shape. The yarn strands, now trimmed and oriented to the twisted wire core perpendicularly, protrude from said core radially. The finished brush length ranges from between ½ inch to 1 inch. According to the example manufacturing process, a "tail" of twisted wire may remain, on the open end, which is around ¾ of an inch in length. If a brush is made with a remaining "tail" section, this "tail" section may be used as a mounting element for mounting the brush to a handle, for example.

Figure 2:
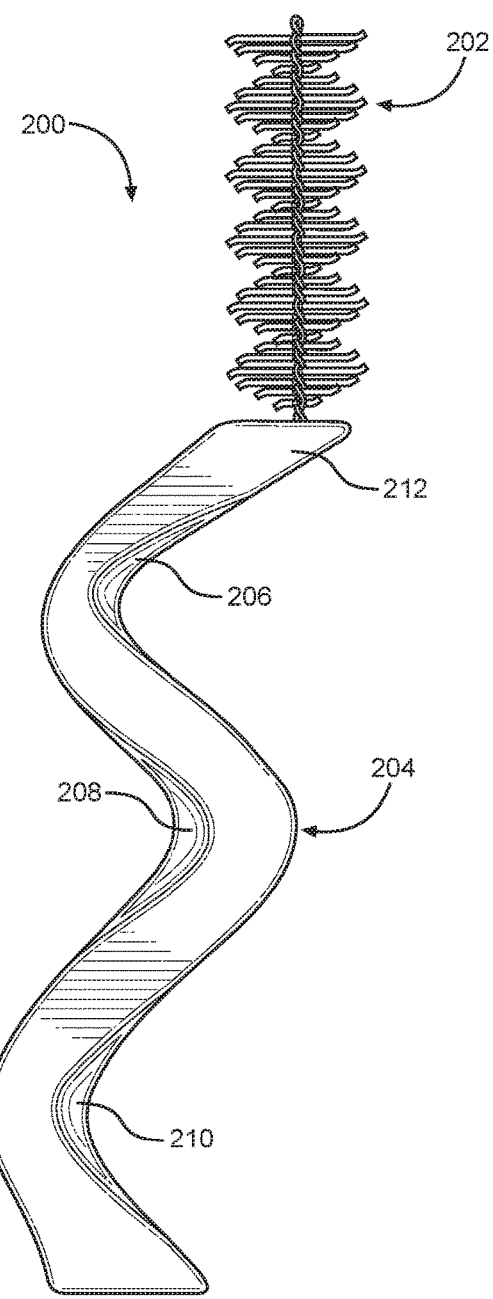
FIG. 2 is a diagram of an interdental brush with a handle according to an embodiment of the present invention.
Figure 3:
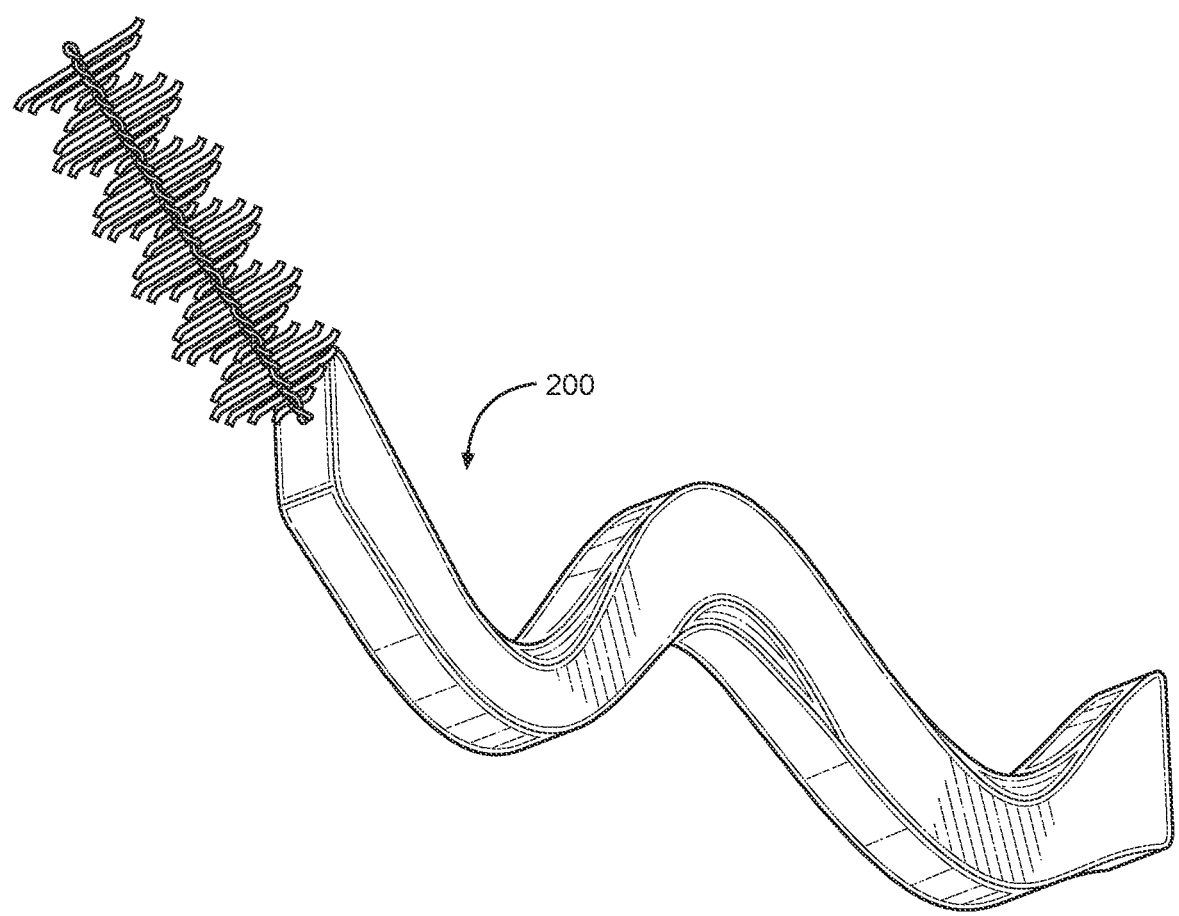
FIG. 3 is a perspective view of the interdental brush of FIG. 2 according to an embodiment of the present invention.

Some embodiments of the present disclosure relate to an interdental brush product comprising an "ergolinear" handle. In one example, the ergolinear handle is made of plastic and is of an S-shape that fits between the thumb on one side and the fore finger and middle finger on the opposite side. FIG. 2 shows an example of one embodiment of an interdental brush 200 comprising a brush 202 and an ergolinear handle 204. Locations 206, 208, and 210 are indicated for placement of the forefinger, thumb, and middle finger, respectively, when a user holds the handle 204. The brush is attached to the handle 204 at handle end 212.

This particular and ergonomically satisfying way the handle fits between these three digits is of novel benefit and importance, especially when the user is trying to negotiate sensitive and infected areas of their dentition with the brush end. The increased fine motor control that is afforded to the user, through utilizing the ergolinear handle, reduces the chance of slippage and injury as the user manually guides the brush end into small and hard-to-reach spaces between teeth and around and below the gum line. As noted above, in some embodiments the "tail" section of a manufacture brush section may be used as a mounting element for mounting a brush to the ergolinear handle.

Figure 4:
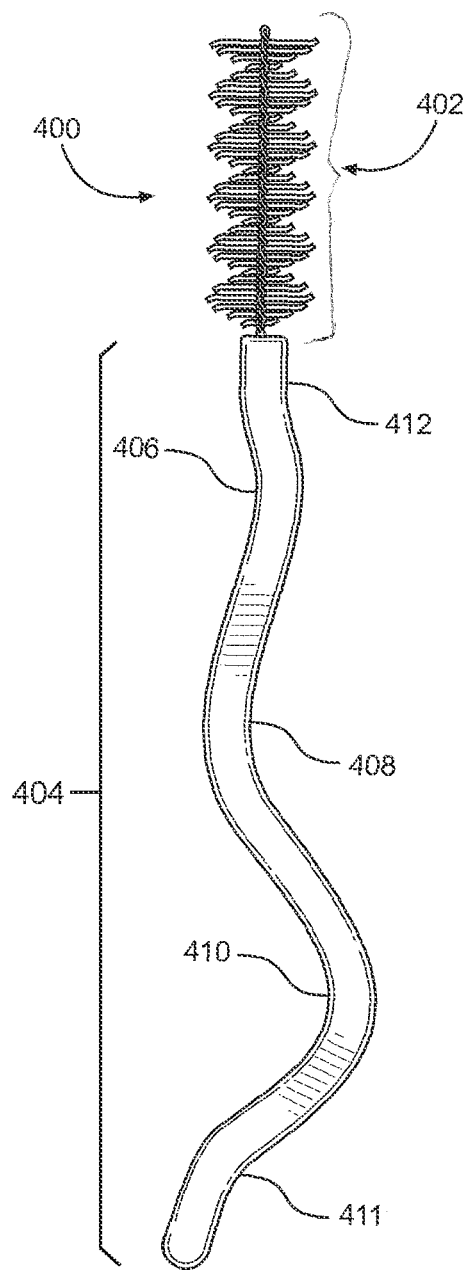
FIGS. 4 and 5 are diagrams of an interdental brush with a handle according to an embodiment of the present invention.
Figure 5:
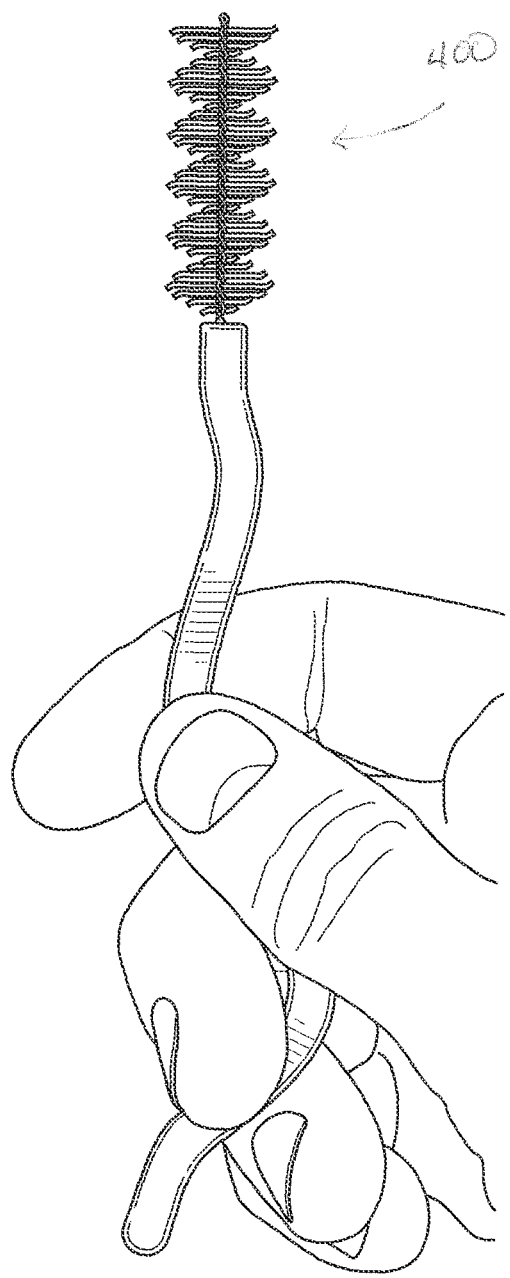

FIG. 4 shows an example of another embodiment of an interdental brush 400 comprising a brush 402 and an ergolinear handle 404. Curved portions 406, 408, and 410 are indicated for placement of the forefinger, thumb, and middle finger, respectively, when a user holds the handle 404. The brush 402 is attached to the handle 404 at handle end 412. Location 411 indicates another optional curved portion at which a user could a fourth finger, for example. FIG. 5 is a second view of the interdental brush 400, depicted with representative placement of the forefinger, thumb, and middle finger at curved portions 406, 408, and 410, in accordance with some embodiments. Handle 404 may be formed of any material known to one of ordinary skill in the art for constructing handles of interdental brushes (e.g., wood, plastic, plastic, rubberized plastic), and may, in accordance with some embodiments, comprise a twisted wire core (not shown in FIGS. 4 and 5).

Figure 6:
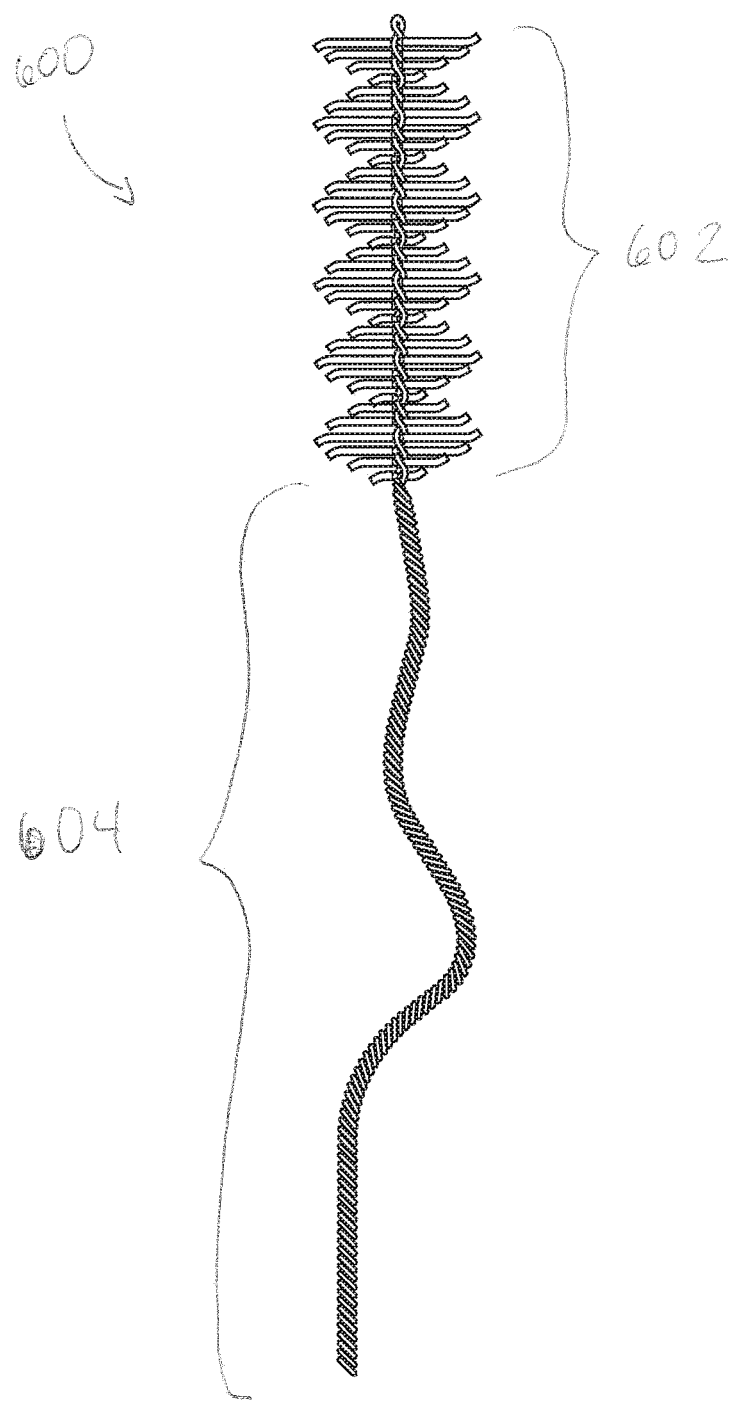
FIG. 6 is a diagram of an interdental brush with a handle according to an embodiment of the present invention.

FIG. 6 shows an example of another embodiment of an interdental brush 600 comprising a brush 602 and an ergolinear handle 604 comprising twisted wire. Curved portions (similar to those depicted in FIG. 4) are indicated for placement of the forefinger, thumb, and middle finger, respectively, when a user holds the handle 604.

Although various embodiments are described in this disclosure with respect to brushes having nylon yarn strands, it will be readily understood that an ergolinear handle may be used with any type of interdental brush, including but not limited to a brush comprising monofilament bristles, nylon yarn strands, and/or any combination of the foregoing.

In accordance with some embodiments of the novel nylon yarn strand interdental device, a surprising phenomenon is observed and confirmed with regard to the behavior of the yarn strand(s) after being clamped and friction-trapped by the twisted wire core. The two sections of yarn strand that exist immediately after emerging from the wire core exhibit unobvious, unexpected and wholly different physical properties. During the twisting and trapping process, there exists a unique and dynamic yarn fiber displacement force exerted on said yarn strand. Because of the compressible nature of the yarn strand, the energy generated during the wire twisting and clamping process dissipates laterally and causes a section, on the yarn strand directly opposite the wire core, where the yarn fibers are suspended in a "bunched and tightened" state. This yarn section is referred to in this disclosure as the "tuft zone". The "tuft zone", located at a first region nearest the twisted wire core after the yarn is free from the twisted wire core, is denser than the rest of the yarn strand and has less propensity to move back-and-forth laterally when deployed by the user for the purposes of oral care. The extra energy required to move this yarn strand section back-and-forth, creates a gentle increase in resistance and, therefore, greater cleaning and massaging capabilities on the teeth and gums.

Unlike the unforeseen properties that are unique to the "tuft zone", the end of the yarn strand which is farthest from the wire core requires less lateral force to enable it to move back-and-forth. This means that the fibers in this section of said yarn strand are not as "bunched and tightened", enabling said strand to be more receptive to the absorption of liquids, and offering a secondary, and still gentler, resistance for more sensitive cleaning applications where pain may be a factor.

According to some embodiments, and as depicted in FIG. 1, one novel characteristic of the "tuft zone" region of the yarn strand is the angle that is created by the sides of the "tuft," relative to the uncompressed width of the upper part of the yarn strand. FIG. 1 depicts one yarn strand 104 (e.g., of a plurality of yarn strands) The filaments of the compressible yarn strand 104 are squeezed together where they are clamped at the wire core 106 by the twisted wire portions 102a and 102b, then start to spread apart from one another in a partially compressed state away from the clamping wire in the zone 108, and finally reach their normal uncompressed density or state that provides the normal, uncompressed width/diameter of the yarn strand (e.g., defining an end of the tuft zone 108).

Accordingly, for embodiments using nylon yarn strands that have compression memory properties (e.g., "crinkled" yarn), an obtuse angle may be formed by the yarn strand on each side of the zone 108. This angle creates a scoring effect, increasing cleaning efficacy in the removal of plaque debris around dental appliances, such as bridges, implants and orthodontic braces, as well as below the gum line.

The differences between the nylon monofilament, "fishing line", bristles in the prior art and the crinkled, nylon yarn strands in various embodiments of the present invention are numerous and substantial. That is, the material comprising the prior art bristle has no body or compression memory, no "tuft zone" and is similar to monofilament, "fishing line." The yarn strand material in accordance with some embodiments of the present invention, on the other hand, has a foam-like compressibility that "springs back" to its original form after being compressed (a quality referred to in this disclosure as "compression memory").

For example, when the present invention is compressed into the tight spaces between teeth and around dental appliances such as bridges and implants, a snug fit is created resulting in a marked increase in cleaning efficacy. Also, due to the unique, foam-like body of the present invention's yarn strand material, very meaningful absorption properties are enjoyed. As aforementioned, these properties lend themselves perfectly to the delivery of beneficial liquid mediums.

Manufacturing Process Alternatives:

In addition to manufacturing a brush in the twisted-in-wire fashion with the yarn strands oriented perpendicularly to the twisted-wire core, as discussed above in the example process, in accordance with other embodiments, a brush may be manufactured with a molten polymer core that subsequently cures into a rigid center. Yarn may then be adhered to it in a parallel orientation. In another example manufacturing process, an interdental brush may be manufactured by twisting wire around a length of yarn oriented parallel to each other.

Alternative Brush Designs:

The finished brush product, in accordance with various embodiments, can be any shape, and comprise yarn strands of any thickness and/or any diameter. For example, the shape of the brush can be curved, straight, conical, bent into a u-shape or circular shape. The brush may optionally be mounted onto a handle that is straight, angled, curved, or has an articulating handle head that can be manually grasped and set at different angles to aid the user when negotiating hard-to-reach interdental spaces.

Although the wire length discussed with respect to the example manufacturing scenario is around two inches total for an interdental application, the wire length may be thicker or thinner, depending on the final application and/or degree of duty required. Information regarding brush/wire length, yarn length and number of yarn strands are described above with respect to the example manufacturing scenario; other variations in the design may be readily understood by those skilled in the art in light of the present disclosure.

While some embodiments are described in this disclosure as having nylon yarn strands, a brush may be fabricated with a combination of nylon monofilament bristles (as in the prior art) and yarn strand types, on a single brush. Or, any one brush may possess two different diameters of yarn strands. In one example, a brush may include both crinkled, nylon yarn strands and nylon monofilament bristles such as those used on the prior art exclusively. Any combination, denier, diameter or texture of bristles and/or yarn strands is possible in the manufacture of the present invention, as deemed appropriate for a desired implementation.

According to one embodiment, the type of wire used in the interdental application is a plastic-coated, stainless steel alloy. The typical range of wire thickness used for interdental applications is: 0.2 millimeters to 1.5 millimeters. For the myriad of other applications, the wire material can be any type of metal or polymer and the diameter would be in accordance to that of the duty required. The heavier the task, the heavier the duty, and thus, the heavier or thicker the wire diameter. Regardless of application and wire diameter, a wire section, bent into a u-shape, is the preferred manufacturing basis. Thus, although more wires may be used, the minimum number of wires to needed to manufacture a brush is preferably one wire.

Brush Uses and Applications:

The brushes comprising nylon yarn strands, as described with respect to various embodiments in this disclosure, as well as the ergolinear handle design, have features advantageous for the cleaning of dental appliances, such as bridges, braces, and implants, and may, in addition or in the alternative be effective for preventive care of periodontitis and other gum ailments.

As discussed above, the crinkled, nylon yarn strands of some embodiments may easily soak up and hold any type of liquid. Another novel advantage associated with the yarn strand is that any liquid coating can be applied at the point of manufacture in the factory and be allowed to dry. The user can then "rehydrate" the coating at the point of use, thus reconstituting the benefits of the coating medium. This can be done with a tooth whitening agent, any powdered drug, and/or other type of powdered material.

The uses and applications of the present invention are numerous and diverse. Interdental cleaning, tube and pipe cleaning, test tube cleaning, bicycle component cleaning, automotive parts cleaning, firearm cleaning, fine instrument cleaning, medical device cleaning, the cleaning of any small hard-to-reach spaces, dish cleaning and more.

What is claimed is:

1. An interproximal brush comprising:
   a brush head comprising at least one nylon yarn strand, each strand comprising a plurality of filaments; and
   a twisted wire core comprising two intertwined wire portions,
   wherein the at least one nylon yarn strand is clamped between the two intertwined wire portions,
   wherein the filaments of the at least one nylon yarn strand start to spread apart from one another in a partially compressed state through a tuft zone adjacent to the twisted wire core,
   wherein after the tuft zone the filaments are in an uncompressed state,
   wherein the at least one nylon yarn strand comprises crinkled nylon filament yarn, and
   wherein the at least one nylon yarn strand has compression memory characteristics.

2. The interproximal brush of claim 1, wherein the at least one nylon yarn strand has hydrophilic characteristics.

3. The interproximal brush of claim 1, wherein the at least one nylon yarn strand comprises at least one applied liquid.

4. The interproximal brush of claim 3, wherein the at least one applied liquid comprises one or more of the following:
   a medication,
   hydrogen peroxide, and
   chlorhexidine.

5. The interproximal brush of claim 1, further comprising an ergolinear handle.

6. The interproximal brush of claim 5, the ergolinear handle comprising at least two curved portions configured for respective placement of a user's fingers.

7. The interproximal brush of claim 5, the ergolinear handle comprising a first curved portion configured for placement of a forefinger, a second curved portion configured for placement of a thumb, and a third curved portion configured for placement of a middle finger, when held by a user.

8. The interproximal brush of claim 5, the ergolinear handle comprising a curved portion terminating at a handle end, wherein the twisted wire core is joined to the handle end.

9. An interproximal brush comprising:
   a brush head comprising at least one nylon yarn strand, each strand comprising a plurality of filaments; and
   a twisted wire core comprising two intertwined wire portions,
   wherein the at least one nylon yarn strand is clamped between the two intertwined wire portions,
   wherein filaments of the at least one nylon yarn strand form a tuft zone adjacent to the twisted wire core,
   wherein the tuft zone is defined by filaments of the at least one nylon yarn strand starting at the twisted wire core to spread apart from one another in a partially compressed state,
   wherein the terminal end of the tuft zone is defined by the filaments being in an uncompressed state,
   wherein the at least one nylon yarn strand comprises crinkled nylon filament yarn, and
   wherein the at least one nylon yarn strand has compression memory characteristics.

10. The interproximal brush of claim 9, further comprising an ergolinear handle.

11. The interproximal brush of claim 10, the ergolinear handle comprising a curved portion terminating at a handle end, wherein the twisted wire core is joined to the handle end.

12. The interproximal brush of claim 10, the ergolinear handle comprising at least two curved portions configured for respective placement of a user's fingers.

13. The interproximal brush of claim 10, the ergolinear handle comprising a first curved portion configured for placement of a forefinger, a second curved portion configured for placement of a thumb, and a third curved portion configured for placement of a middle finger, when held by a user.

14. The interproximal brush of claim 9, wherein the at least one nylon yarn strand has hydrophilic characteristics.

15. The interproximal brush of claim 9, wherein the at least one nylon yarn strand comprises at least one applied liquid.

16. The interproximal brush of claim 15, wherein the at least one applied liquid comprises one or more of the following:
a medication,
hydrogen peroxide, and
chlorhexidine.

17. An interproximal brush comprising:
a brush head comprising at least one compressible strand of crinkled nylon filament yarn, each strand comprising a plurality of filaments,
wherein the at least one compressible strand has compression memory characteristics; and
a twisted wire core comprising two intertwined wire portions,
wherein the plurality of filaments are clamped between the two intertwined wire portions, compressing the plurality of filaments together,
wherein the compressing creates in the at least one compressible strand a portion, adjacent to the twisted wire core, that is angled relative to a longitudinal direction of the at least one compressible strand through the two intertwined wire portions.

18. The interproximal brush of claim 17, the angled portion of compressed filaments adjacent to the twisted wire core providing a scoring effect when used for cleaning interproximal spaces.

19. The interproximal brush of claim 17, wherein the at least one compressible strand has hydrophilic characteristics.

20. The interproximal brush of claim 17, wherein the at least one compressible strand comprises at least one applied liquid.

\* \* \* \* \*

UNITED STATES PATENT AND TRADEMARK OFFICE
CERTIFICATE OF CORRECTION

| | |
|---|---|
| PATENT NO. | : 11,206,918 B2 |
| APPLICATION NO. | : 16/364175 |
| DATED | : December 28, 2021 |
| INVENTOR(S) | : Brett W. Thornton |

It is certified that error appears in the above-identified patent and that said Letters Patent is hereby corrected as shown below:

In the Specification

Column 2, Line 30, instance of -%- should be changed to --3/4--.

Signed and Sealed this
Eighth Day of November, 2022

Katherine Kelly Vidal
*Director of the United States Patent and Trademark Office*